(No Model.)

A. D. CLARKE
AMALGAMATOR.

No. 247,483. Patented Sept. 27, 1881.

5 Sheets—Sheet 1.

Witnesses—
J. Everett Brown
H. W. Munday.

Inventor—
Alexander D. Clarke
By Munday Evarts & Adcock
his Atty's (No Model.) 5 Sheets—Sheet 3.
A. D. CLARKE.
AMALGAMATOR.

No. 247,483. Patented Sept. 27, 1881.

Witnesses—
J. Everett Brown
H. W. Munday.

Inventor—
Alexander D. Clarke
By Munday, Evarts & Adcock,
his Atty's (No Model.) 5 Sheets—Sheet 4.
A. D. CLARKE.
AMALGAMATOR.
No. 247,483. Patented Sept. 27, 1881.
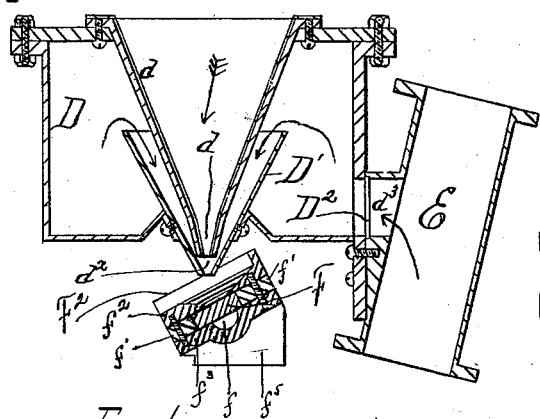
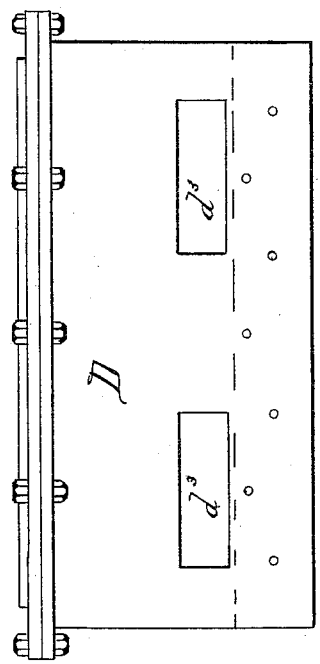
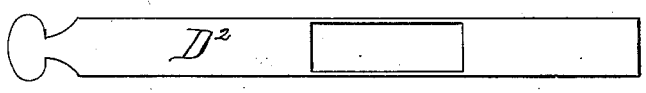
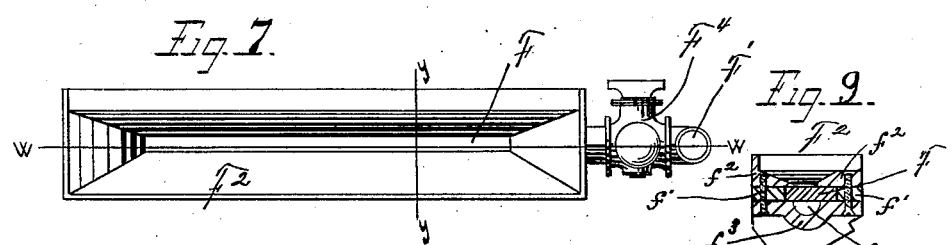
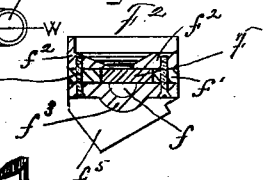
Witnesses—
J. Everett Brown
H. W. Munday.
Inventor—
Alexander D. Clarke
By Munday Evarts & Adcock
his Atty's.

(No Model.)
5 Sheets—Sheet 5.
A. D. CLARKE.
AMALGAMATOR.
No. 247,483. Patented Sept. 27, 1881.
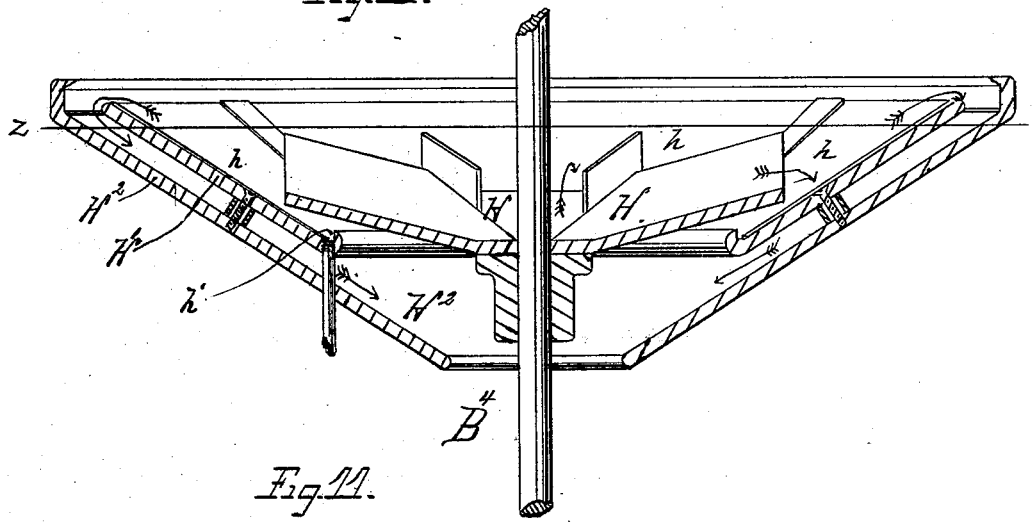
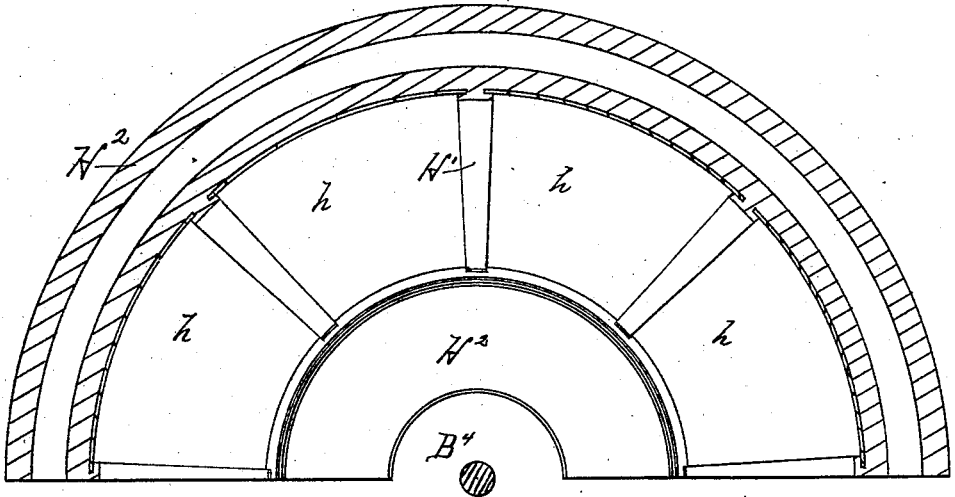
Witnesses—
T. Everett Brown
H. M. Munday.
Inventor—
Alexander D. Clarke
By Munday, Evarts & Adcock
his Atty's.

UNITED STATES PATENT OFFICE.

ALEXANDER D. CLARKE, OF OMAHA, NEBRASKA.

AMALGAMATOR.

SPECIFICATION forming part of Letters Patent No. 247,483, dated September 27, 1881.

Application filed July 19, 1881. (No model.)

*To all whom it may concern:*

Be it known that I, ALEXANDER D. CLARKE, of Omaha, Douglas county, Nebraska, have invented certain new and useful Improvements in Amalgamators, of which the following is a specification.

This invention concerns the construction of the class of amalgamators shown in a previous application filed by me April 8, 1881, and is designed to render the apparatus more efficient and to adapt it to use under varying conditions.

Figure 1:
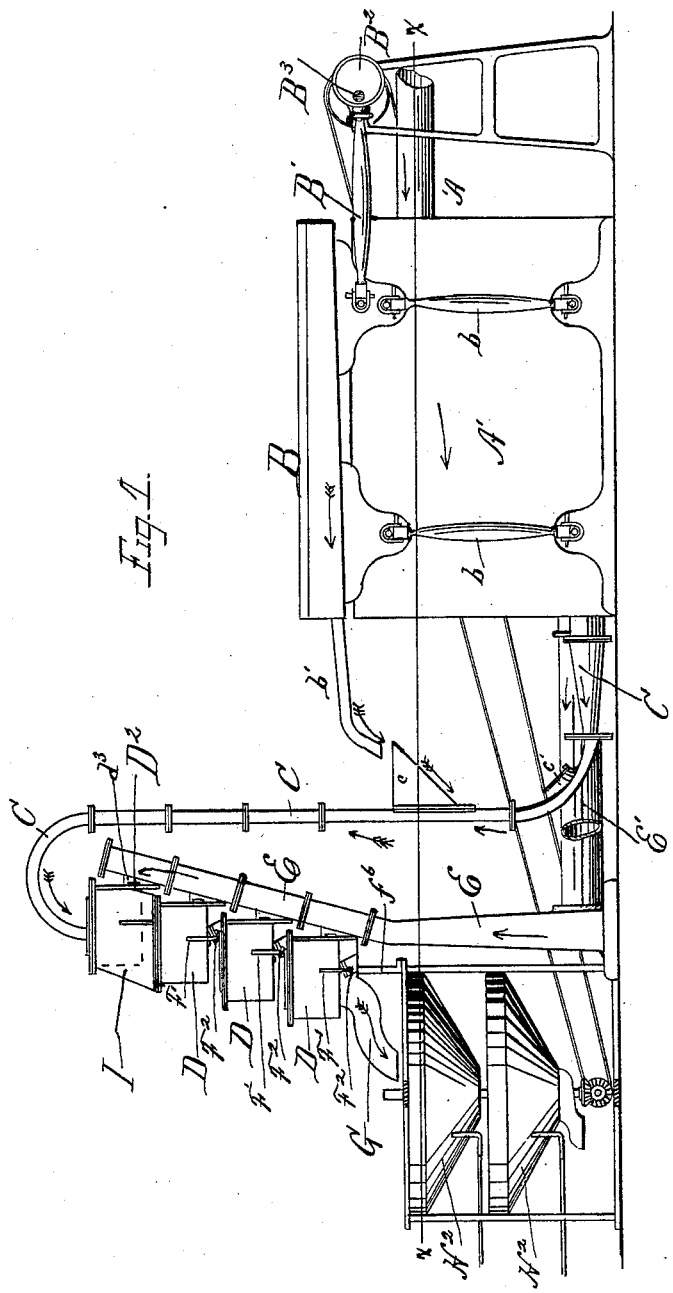
Figure 2:
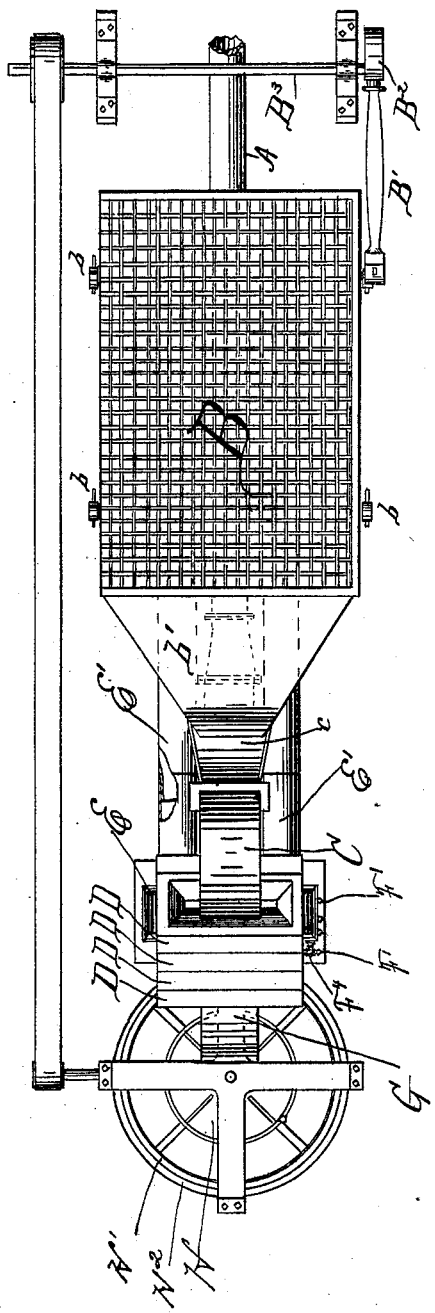
Figure 3:
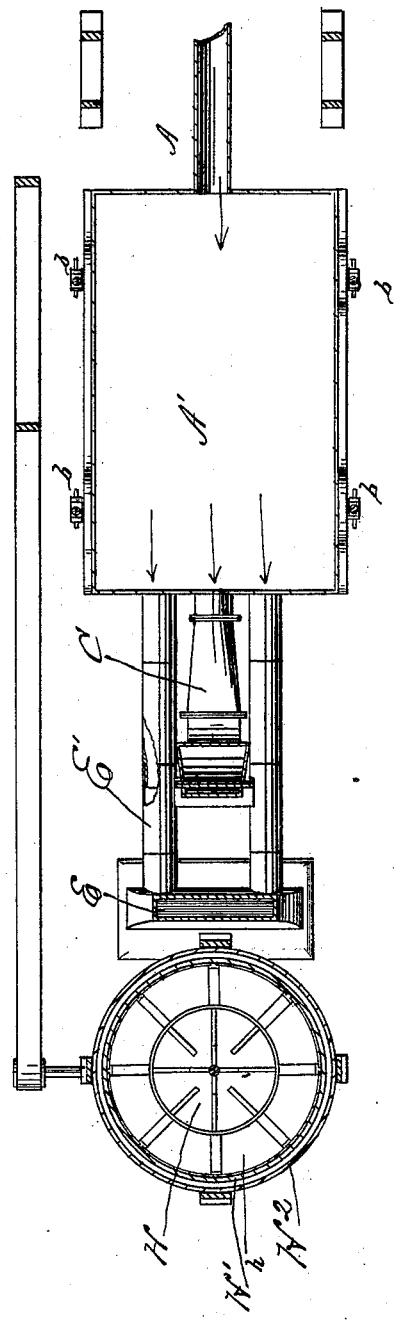

In the accompanying drawings, Figure 1 is a side elevation, and Fig. 2 a plan view, of my improved amalgamator. Fig. 3 is a horizontal section on the line $x\ x$ of Fig. 1. Fig. 4 is a vertical cross-section of one of the amalgamating air-boxes. Fig. 5 is a detail side view of the same. Fig. 6 shows the sliding valve used to regulate the admission of the blast to the amalgamating air-boxes, Fig. 4. Figs. 7, 8, and 9 are top and longitudinal and cross-sectional views of the mercury-reservoir. Figs. 10 and 11 are vertical and horizontal sections of the centrifugal concentrator.

In the drawings, A represents a conducting-pipe, leading from a blower (not shown) to an air-box, A', which serves to store and equalize the blast.

B is a shaking screen or series of screens, mounted upon pivoted arms $b$ and actuated by the pitman B' and eccentric B² upon the shaft B³. From this screen the alluvial soil, after it has worked through the screen, is discharged by a spout, $b'$, into a hopper, $c$, upon the sectional upright flat conducting-pipe C, the lower end of which extends to and opens from the air-box, as shown. This lower extension may be provided with a hand-hole, $c'$, at the bend, for the purpose of removing any obstructions which may find their way thereinto.

The conductor C, at its upper end, is bent over, so as to enable it to deliver the blast-driven earth into the amalgamating air-box D. Interiorly this receptacle is provided with sloping sides, converging at the bottom, so as to form a long narrow throat or slit, $d'$, through which the mineral earth must pass. Upon these sloping sides are placed removable amalgamating-plates $d$, of thin metal. This throat is surrounded by a sloping-sided frame, D', located principally within the box D, but extending below said throat, and having a similar contracted throat, $d^2$, at its bottom. Into the interior of the amalgamating air-box D, and under the sloping parts which sustain the amalgamating-plates, another portion of the blast is admitted by the wide and flat sectional pipe E and its connections E' from the air-box at two openings, $d^3\ d^3$, which are regulated by a sliding valve, D². By this means additional force is given the earth as it issues from the throat $d'$, so that it impinges upon the mercury which is supplied by percolation through the diaphragm F from the body of mercury contained in the recess $f$ and fed from the tube F', such diaphragm and recess being embodied in the frame F², which is placed immediately under the amalgamating air-box D, with the diaphragm registering with the throat $d^2$.

In my said former application I showed a similar body of mercury continuously supplied to the blast of mineral-carrying material by percolation through a diaphragm; but the diaphragm in that case was formed of buckskin or some similar material. I have found by trials that a body of wood, preferably hard wood, like maple or the like, and some half or three-quarters of an inch in thickness, (though the thickness is not an essential matter, because the mercury will insinuate itself through the pores of much thicker pieces,) answers the purpose of this diaphragm much better than any material indicated in my former invention. This diaphragm is fitted in a rectangular metal frame, $f'$, which is placed between an upper frame, $f^2$, also rectangular and sloping downward interiorly upon all sides, and a bottom plate, $f^3$, said frames and plates being secured together and composing the structure F². The recess $f$ is formed in the plate $f^3$. A plug, F⁴, is inserted in the tube F' to regulate the feed of the mercury, the rapidity of which may be indicated by floats in each tube. Depending from the lower plate are two flanges, $f^5$, which rest upon the amalgamating air-box next underneath, and are so shaped as to cause the frames F² to assume an inclined position, as shown in Fig. 4. By placing the diaphragms upon an incline the mercury which has taken up the mineral flows off readily, and the diaphragm is not worn away so fast as it would be if it were positioned horizontally. Each amalgamating air-box receives its augmenting blast from the pipe E in the same manner, and all may be supported from said pipe, as in Fig. 4, which may be made of cast metal to permit it to receive such burden. The bottom of frame $F^2$ is supported by a standard, $f^6$, or in some other suitable way.

Of these amalgamating air-boxes and mercury-supplying devices I use such number as is requisite for the soil which the apparatus may be used to work, and in order to permit changes in the number, either as occasion requires in use or in construction, I make them alike, and also construct the blast and earth feeding pipes in joints or sections, as shown, and also make the connecting-pipes E' in telescoping sections, as also shown. With this construction, and with the spaces between these air-boxes and in front and at the ends of these mercurial diaphragms and their holding-frames being closed by hoods I, of which only one is shown, but which are applied to all of said boxes, the mineral-bearing earth or pulverized rock, upon being poured into the hopper $c$ and subjected to the action of the air-blast, flows in a continuous stream through the perpendicular pipe C and the series of amalgamating air-boxes and over the mercurial diaphragms. Thus, commencing with the first box D, the mineral-bearing material issues through the slit $d^2$, and is wholly or partly amalgamated by being impinged upon the mercurial diaphragm immediately thereunder. A part of this amalgam is taken up by the plates $d$, lining the air-box D. The same operation is repeated in the next and all succeeding boxes, and in this way the material is alternately amalgamated and robbed of its amalgam as often as may be found necessary, until at last it passes into the centrifugal concentrator, and the remaining amalgam is concentrated or deposited upon the plates surrounding it, as hereinafter mentioned. From the last box and diaphragm the current is delivered by the spout G to one or more centrifugal concentrators, H, by which it is thrown upon dished surrounding surfaces H', covered with amalgam-plates $h$. From here the loose light particles will be carried by the centrifugal force over said surfaces and into the space between them and the under or outer case, $H^2$, and from thence fall through the center into the next concentrator, H, if another is used, while the free mercury will be caught by the trough $h'$ at the bottom of H' and conducted into a proper receptacle to be used over again. These concentrators may be operated from the shaft $B^4$, as shown.

Of course I do not wish to be limited to an air-blast, as any equivalent blast may be substituted for it. Nor do I wish to be limited to the use of mercury alone, as any other amalgam which will penetrate the pores of the diaphragm may be employed.

Some portions of my improved amalgamator may be used with diaphragms of other porous material than wood; but the organized apparatus shown is the best form known to me at the present time.

I claim—

1. The combination of a blast-conducting device, a series of amalgamating air-boxes, D, and mercury-supplying devices, jointed blast and earth feeding pipes, and telescoping connecting-pipes E', whereby the apparatus is rendered changeable, according to the work required, substantially as set forth.

2. In an amalgamator, the combination of blast-conducting devices for guiding the mineral-carrying material, a diaphragm of wood, against which the material is driven, and a plate back of the diaphragm having a recess upon the side thereof, adjoining the diaphragm, adapted to contain a body of mercury, substantially as specified.

3. The combination of the diaphragm of wood, its surrounding frame of metal, and a bottom metal plate having a recess therein adjoining the diaphragm, held together by suitable fastenings, substantially as set forth.

4. The combination, in an amalgamator, with devices for conducting the mineral-carrying material, of a centrifugal concentrator, H, a dished amalgamating-surface surrounding the concentrator, and provided with a trough, $h'$, and the outer case, $H^2$, substantially as specified.

ALEXANDER D. CLARKE.

Witnesses:
H. M. MUNDAY,
T. EVERETT BROWN.